(12) United States Patent
Casals et al.

(10) Patent No.: US 10,077,001 B2
(45) Date of Patent: Sep. 18, 2018

(54) FOLD REAR-VIEW MIRROR ASSEMBLY FOR MOTOR VEHICLES

(71) Applicant: FICO MIRRORS, S.A., Barcelona (ES)

(72) Inventors: Juan Linares Casals, Barcelona (ES); José Mendoza Vicioso, Barcelona (ES)

(73) Assignee: FICO MIRRORS, S.A., Viladecavalls (ES)

( * ) Notice: Subject to any disclaimer, the term of this patent is extended or adjusted under 35 U.S.C. 154(b) by 19 days.

(21) Appl. No.: 15/275,837

(22) Filed: Sep. 26, 2016

(65) Prior Publication Data
US 2017/0088054 A1 Mar. 30, 2017

(30) Foreign Application Priority Data
Sep. 29, 2015 (EP) .................................... 15187452

(51) Int. Cl.
*G02B 7/182* (2006.01)
*B60R 1/074* (2006.01)
*B60R 1/062* (2006.01)
*B60R 1/076* (2006.01)

(52) U.S. Cl.
CPC .............. *B60R 1/074* (2013.01); *B60R 1/062* (2013.01); *B60R 1/076* (2013.01)

(58) Field of Classification Search
CPC .. B60R 1/02; B60R 1/025; B60R 1/06; B60R 1/062; B60R 1/07; B60R 1/072; B60R 1/074

USPC ................................. 359/838, 841, 843, 844
See application file for complete search history.

(56) References Cited

U.S. PATENT DOCUMENTS

| 6,116,743 A | 9/2000 | Hoek | |
|---|---|---|---|
| 2004/0238306 A1* | 12/2004 | Reed | F16D 41/16 192/43.1 |
| 2008/0266688 A1* | 10/2008 | Errando Smet | B60R 1/074 359/877 |
| 2012/0087026 A1* | 4/2012 | Schuurmans | B60R 1/074 359/841 |

FOREIGN PATENT DOCUMENTS

ES 2166677 A1 4/2002

* cited by examiner

*Primary Examiner* — Robert E Tallman
(74) *Attorney, Agent, or Firm* — Cantor Colburn LLP

(57) ABSTRACT

A foldable rear-view mirror assembly comprises a base member to be mounted on a motor vehicle, a mirror housing, a motor component, drive means comprising a ring gear assembly engaging the motor component with the base member for rotation of the mirror housing thereto between mirror operative and folded conditions, and a spring element positioned substantially tangential to the ring gear assembly to cooperate therewith such that in a first direction of rotation the mirror housing is allowed to rotate to the base member and in a second reverse direction of rotation the mirror housing is prevented from being rotated relative to the base member, where the spring element resiliently abuts a stop surface formed in the ring gear assembly.

18 Claims, 5 Drawing Sheets

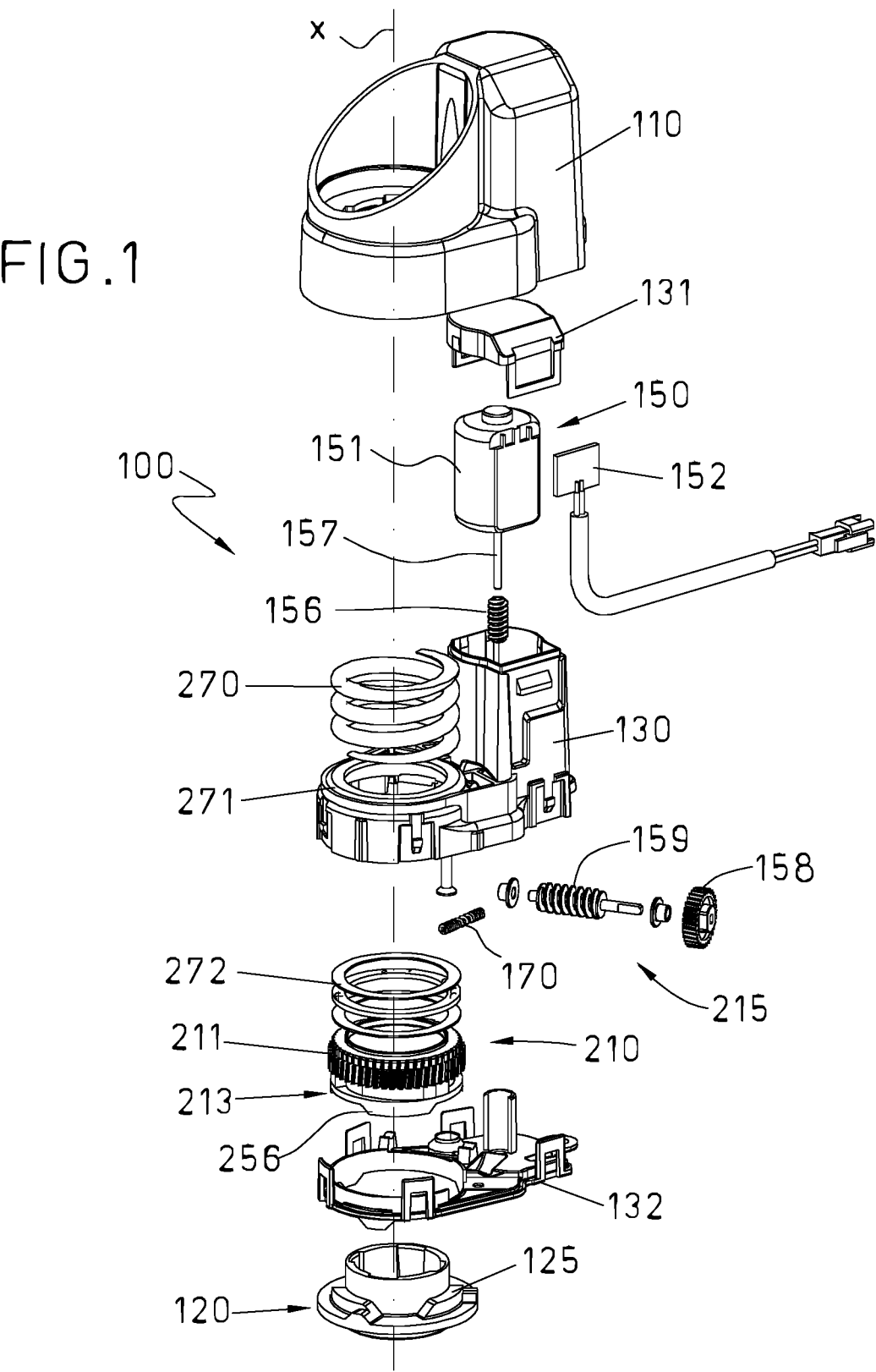

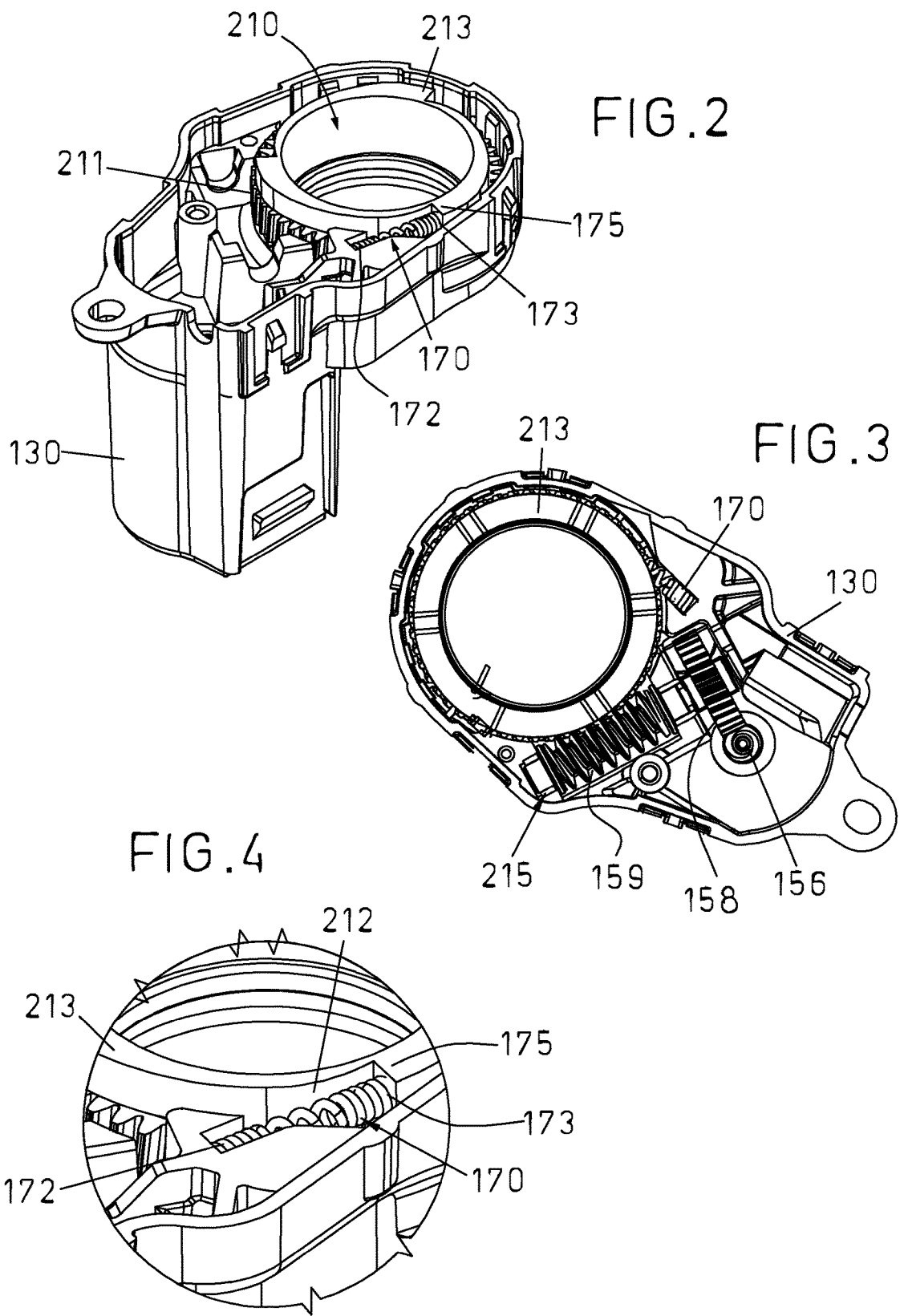

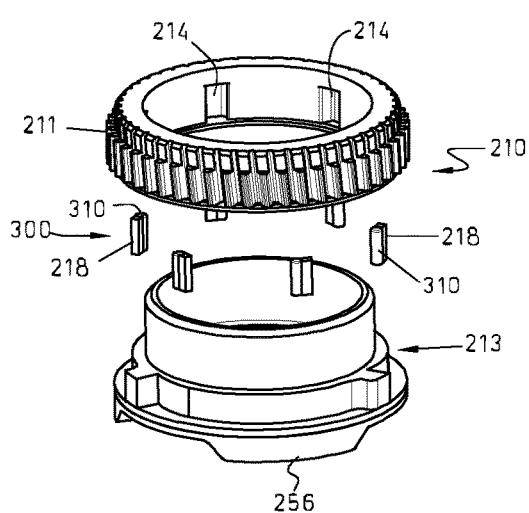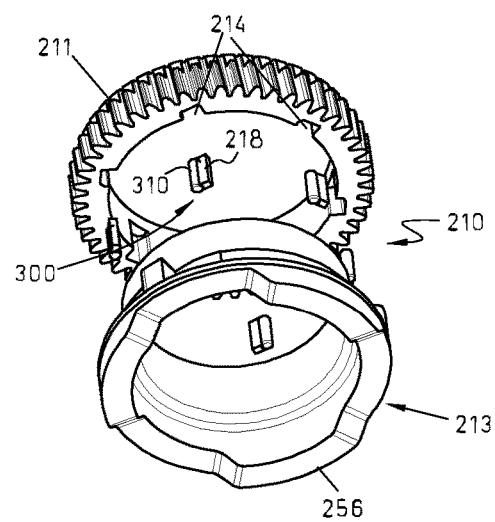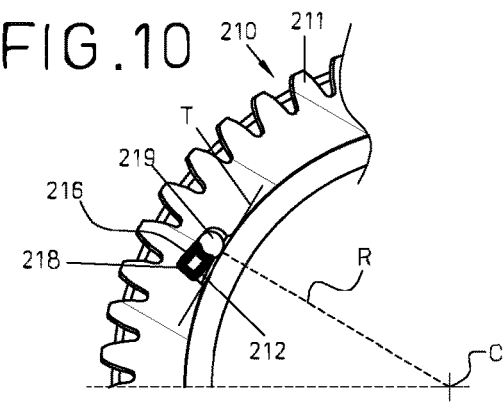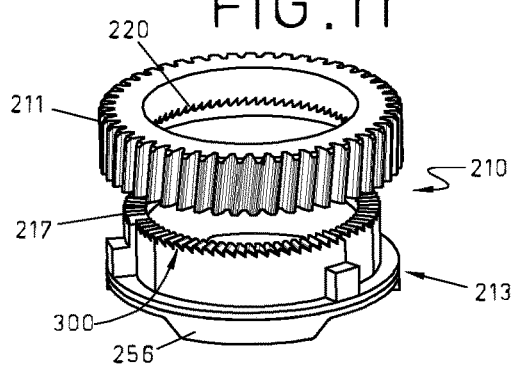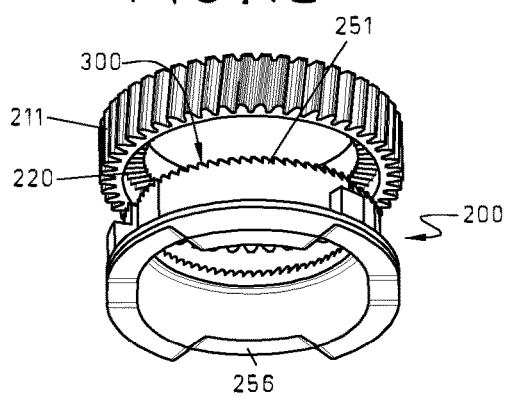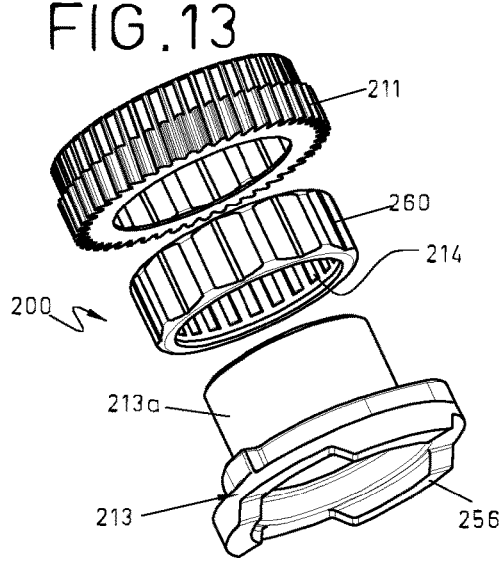

FOLD REAR-VIEW MIRROR ASSEMBLY FOR MOTOR VEHICLES

CROSS-REFERENCES TO RELATED APPLICATIONS

This patent application claims priority to European Application No. 15187452.6, filed Sep. 29, 2015, which is incorporated herein by reference in its entirety.

The present disclosure relates to external mirrors for motor vehicles and, more specifically, to external fold rear-view mirror assemblies for motor vehicles.

BACKGROUND

External fold rear-view mirrors for motor vehicles are known in the art comprising a base member intended to be secured to a vehicle body and a mirror housing for receiving a mirror fitted therein. The mirror housing can be rotated, manually and/or through an electric motor and transmission means, relative to the base member between a mirror operative condition, or driving position, in which the mirror projects from the vehicle body, and a mirror folded condition, or parking position, in which the mirror housing is folded towards the vehicle body such that the distance by which the mirror housing projects from the vehicle body is reduced, and vice versa.

Locking means are also typically provided for holding the mirror housing in said driving and parking positions or even in other different specific angular positions. The locking means may be for example a detent mechanism comprising detent elements formed in the mirror housing and in the base member, respectively, adapted for locking the mirror housing in said specific angular positions. Rear-view mirrors are subject to strong temperature variations, which range from −40° C. to 80° C., and a high number of folding and unfolding cycles. As a result, materials employed for manufacturing a means for driving the mirror in rotation comprising a ring gear assembly need to have little or no dimensional variations during the product life to ensure correct operation. Thus, typically said driving means, and specially the ring gear assembly, are made of a metallic material, such as zamak. However, these materials are hard and locking means have to be designed accordingly so as to avoid wearing out during product life. Otherwise, the specific angular positions vary over time resulting in maladjustment between the base member and the mirror housing.

Depending on the external appearance of the base member and the mirror housing, clearances between both may become even visible.

ES2166677 discloses a driving mechanism for rear-view mirrors in motor vehicles. The automatic driving mechanism comprises a base member to be secured to a vehicle body, a mirror housing having a mirror fitted therein and motor means and driving means for driving the mirror housing in rotation relative to the base member between said driving and parking positions. The motor means and driving means are housed in a motor housing that is attached to the mirror housing. Said mirror housing positions are defined by teeth formed in the base member and the mirror housing forming a detent mechanism as mentioned above. Position fixing means are provided comprising a spring biased rod that is arranged in a recess in the motor housing to act radially against a stop surface formed in a groove in one of a number of grooves formed in a ring gear assembly that is part of the driving means.

The rod has to be made of a suitable material to limit wearing to acceptable tolerances so as to avoid variation of the specific angular positions during product life, which in turn leads to the motor housing having also to be made of a suitable material to avoid wearing of the recess in which the rod is arranged. In practice, this means that the rod and the motor housing are made of metal. Therefore, in order to avoid the positioning problem, the driving means, position fixing means and motor housing have to be made of metal, which lead to a cost and weight increase, entailing other known problems such as vibration and higher electric power consumption. A fold rear-view mirror assembly for motor vehicles is provided herein which has been shown to solve this technical problem.

SUMMARY

The present fold rear-view mirror assembly comprises a base member for being mounted on a motor vehicle, a mirror housing for receiving a mirror pane therein, a motor component, and drive means associated with said motor component. The drive means comprise a ring gear assembly engaging the motor component with the base member for driving the mirror housing in rotation relative to the base member around a mirror rotation axis between a mirror operative condition (drive position) and a mirror folded condition (parking position), and vice versa. The ring gear assembly may be disposed, for example, coaxially with the mirror rotation axis.

A spring element is also provided positioned in a direction that is substantially tangential to the ring gear assembly. A substantially tangential direction means herein a direction where at least one portion of the spring element merely touches at least one portion of the ring gear assembly's periphery. Such direction is generally perpendicular to a radius of the ring gear assembly that extends from the center of the ring gear assembly to a point of said portion of the spring element where the spring element touches the ring gear assembly.

The spring element is adapted to cooperate with the ring gear assembly such that:
in a first direction of rotation, the mirror housing is allowed to rotate relative to the base member, and
in a second, reverse direction of rotation, the mirror housing is prevented from being rotated relative to the base member, where the spring resiliently abuts a stop surface.

As the mirror housing is rotated relative to the base member according to said first direction of rotation, the spring element resiliently deforms as it slides against the ring gear assembly. The resilient deformation of the spring element may be for example at least one of flexure, bending, twisting, etc.

The ring gear assembly may comprise a gear wheel and a gear rim. In some examples, the gear wheel and the gear rim are fixedly attached to each other or integrally formed with each other. However, in other examples, the gear wheel may be coupled to the gear rim through a one-way clutch mechanism such that the gear wheel and the gear rim rotate together in one direction and rotate relative to each other in a second, opposite direction. The combination of the spring element with such one-way clutch mechanism allows possible plays between the gear wheel and the gear rim to be reduced.

The above mentioned stop surface may be arranged in a slide surface formed in the ring gear assembly. The stop surface may be arranged radially to the mirror rotation axis, such as, for example, in a position substantially perpendicular to the ring gear assembly, and, more specifically, in a position substantially perpendicular to the slide surface. The stop surface is preferably formed in the gear rim but it may be also formed in the gear wheel.

The slide surface may be for example a groove adapted for at least partially receiving the spring element therein. The spring element has a first end that is attached to the mirror housing, and in some cases to a motor housing which will be described further below. The spring element has a second, opposite free end which is received into the slide surface of the ring gear assembly. In this case, the slide surface is preferably formed in the gear rim but it may be also formed in the gear wheel. However, in other cases, the stop surface could be formed in the mirror housing, arranged to receive a second free end of the spring element, with the first end of the spring element being attached to the ring gear assembly. In any case, the spring element and the stop surface both define at least one of the above mentioned mirror operative conditions such as for example the drive position.

The provision of a spring element positioned in a direction that is substantially tangential to the ring gear assembly results in that tolerances are advantageously absorbed when the mirror housing is rotated. The spring element acts as a flexible mechanical stop for the folding operation of the mirror housing. It has been found that the flexible nature of the spring element, in addition to its positioning relative to the ring gear assembly allows both mechanical maladjustments to be absorbed and mirror positioning to be effectively stabilized.

It is preferred that the spring element is a compression spring. A metal compression spring may be more preferred although other spring elements may be also used made from any other flexible materials such as plastic, or even from a combination of different materials. The spring element may alternatively be also configured in the form of a strip such as a metal and/or plastic strip.

A further advantage of using a spring element acting as a flexible mechanical stop positioned in a direction that is substantially tangential to the ring gear assembly results in that it ensures stability of the mechanical stop bending that is required for an efficient operation as the mirror housing is rotated.

A motor housing is also provided. The motor housing is a receptacle adapted for receiving the motor component therein and attached by any suitable means to the mirror housing. However, the motor housing could be formed integral with the mirror housing.

In some examples, the mirror housing may be adapted for receiving an imaging device configured for imaging an image of the surroundings of the vehicle, such as a video camera. The imaging device may be provided in place of or in addition to the mirror pane.

The mirror pane may be an anti-glare mirror pane, such as a mirror pane using a cell of electrically changeable optical characteristic or a mirror pane using a liquid filtering layer of variable thickness. Examples of cells of electrically changeable optical characteristic are liquid-crystal and electrochromic mirrors. In further examples, the mirror pane may further comprise a heating element. A spotter mirror may be also arranged housed in the mirror housing and positioned so as to substantially provide vision of a vehicle blind spot region to the vehicle driver when the mirror housing is positioned in the driving position.

A number of additional features are also envisaged for the present rear-view mirror assembly. For example, one or more of an antenna for communicating with a radio-frequency reception system, an actuation mechanism configured to provide orientation of the mirror pane to adjust the rear field of view of the vehicle driver, an outdoor temperature sensing device configured to sense an outdoor temperature of the vehicle and one or more illumination modules, may be provided in the mirror housing and/or in the mirror base.

Additional objects, advantages and features of examples of the present fold rear-view mirror assembly for motor vehicles will become apparent to those skilled in the art upon examination of the description, or may be learned by practice thereof.

BRIEF DESCRIPTION OF THE DRAWINGS

Particular examples of the present fold rear-view mirror assembly for motor vehicles will be described in the following by way of non-limiting examples, with reference to the appended drawings, in which:

FIG. 1 is a general diagrammatic exploded view of one example of a fold rear-view mirror assembly;

FIGS. 2 and 5 are fragmentary perspective views of the motor housing showing in detail the positioning of the spring element relative to the gear wheel of the drive means;

FIG. 3 is a top view of the motor housing shown in FIG. 2;

FIG. 4 is a fragmentary enlarged view of FIG. 2;

FIGS. 8 and 9 are perspective exploded views from different angles of the rearview mirror assembly with the gear wheel and the gear rim separated from each other where one example of the clutch mechanism is shown;

FIG. 10 is a partial sectional view of the gear wheel and the gear rim where the example of the clutch mechanism has been detailed;

FIGS. 11 and 12 are perspective exploded views from different angles of the rearview mirror assembly with the gear wheel and the gear rim separated from each other where a further example of the clutch mechanism is shown; and FIG. 13 is an exploded perspective view of one example where the recesses for receiving the interlocking members are formed in a separate piece of the gear wheel.

DETAILED DESCRIPTION OF EXAMPLES

Figure 5:
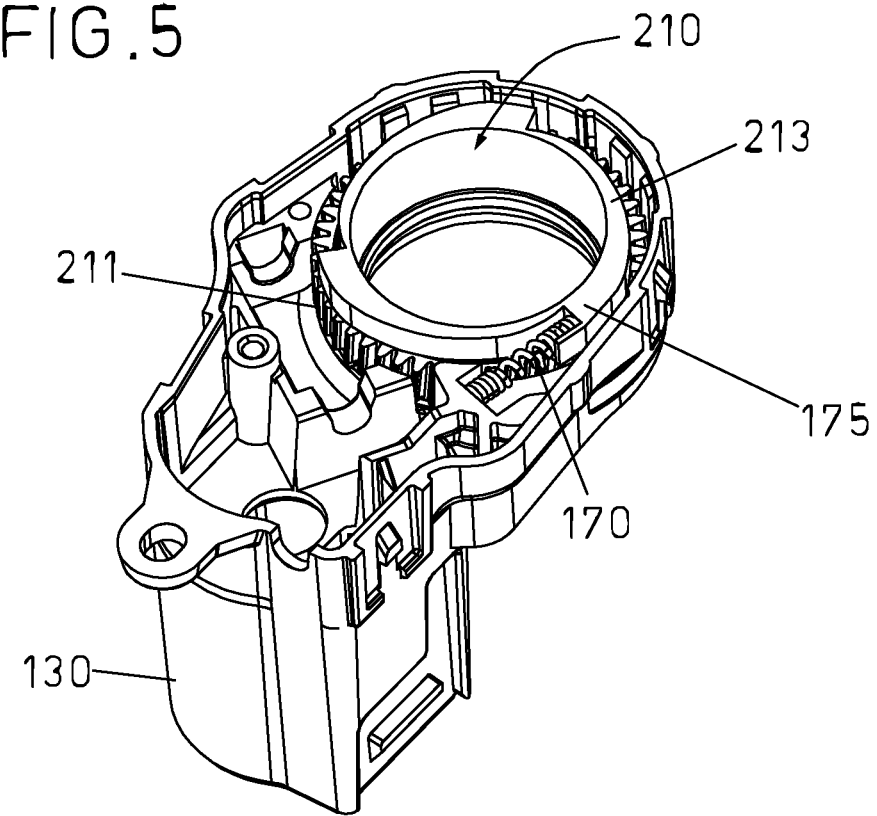
Figure 6:
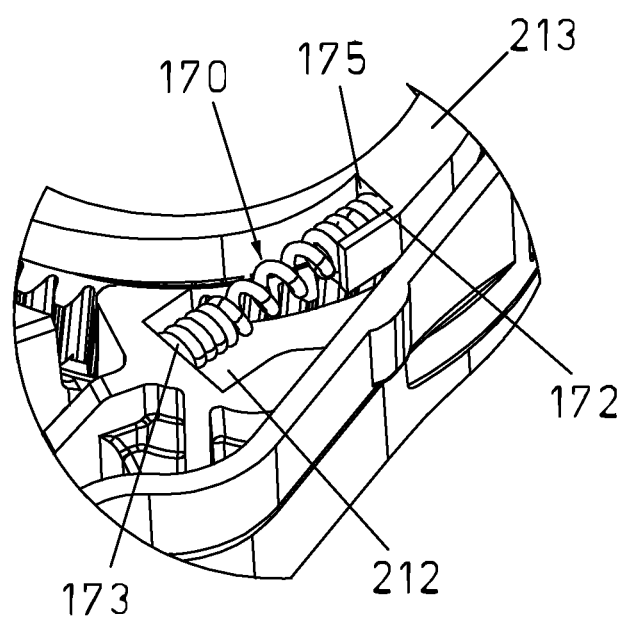
FIG. 6 is a fragmentary enlarged view of FIG. 5.

One non-limiting example of a fold rear-view mirror assembly is described herein with reference to the figures of the drawings. In the examples shown, the rear-view mirror assembly 100 comprises a base member 120 fixedly mounted on a motor vehicle (not shown).

Referring to FIG. 1, the rear-view mirror assembly 100 includes a mirror housing 110 for receiving a mirror pane therein (not shown). The mirror housing 110 in turn includes a motor housing 130 for receiving a motor component 150 therein. The motor housing 130 is attached to or is part of the mirror housing 110 so that they are rotated together as the motor component 150 is actuated.

The motor housing 130 also includes connecting means 152 for electric connections of the motor component 150 to a control unit and a power supply (not shown). The motor housing 130 further includes an upper cover 131 and a lower cover 132.

The motor component 150 comprises an electric motor 151. As stated above, the electric motor 151 serves the purpose of rotating the mirror housing 110, together with the motor housing 130, relative to the base member 120 around a mirror rotation axis x, as shown in FIG. 1, between a mirror operative condition and a mirror folded condition, and vice versa.

In order for the motor component 150 to transmit the rotating movement to the mirror housing, drive means 215 are provided. The drive means 215 comprise a driving worm gear 156 attached to a motor output shaft 157. The worm gear 156 engages a driven wheel 158 meshing with a driven worm gear 159. The driven worm gear 159, in turn, engages a gear wheel 211 of a ring gear assembly 210. In the specific example shown in the exploded view of FIG. 1, the ring gear assembly 210 is disposed coaxially with the mirror rotation axis x. Sliding tracks 272 are also provided associated with the gear wheel 211 for facilitating rotation to the base member 120.

The base member 120 has projections 125 formed therein for cooperating with corresponding projections 256 formed in a gear rim 213 of the ring gear assembly 210. Projections 125, 256 are part of a detent mechanism for locking the mirror housing 110 in specific stable angular positions to the base member 120. Rotation of the mirror housing 110 relative to the base member 120 causes the projections 256 of the gear rim 213 to slide relative to the projections 125 of the base member 120 causing the mirror housing 110 to be displaced vertically relative to the base member 120 compressing a main spring 270, which is shown in FIG. 1, until a mirror condition, such as the mirror folded or parking position, has been reached. Then, the mirror housing 110, together with the motor housing 130, are displaced downwards again relative to the base member 120 releasing the main spring 270. The process for turning the mirror housing 110 back to the mirror operative condition (driving position) is the same as disclosed but in the reverse order.

The gear wheel 211 and the gear rim 213 of the ring gear assembly 210 do not necessarily have to be fixedly attached to each other or integrally formed with each other as in the example of FIG. 1. For example, in the rear-view mirror assembly 100 shown in FIGS. 7-12, the gear wheel 211 and the gear rim 213 are coupled to each other through a one-way clutch mechanism 300. The one-way clutch mechanism 300 together with the spring element 170 allows tolerances between the gear wheel 211 and the gear rim 213 to be efficiently reduced.

Figure 7:
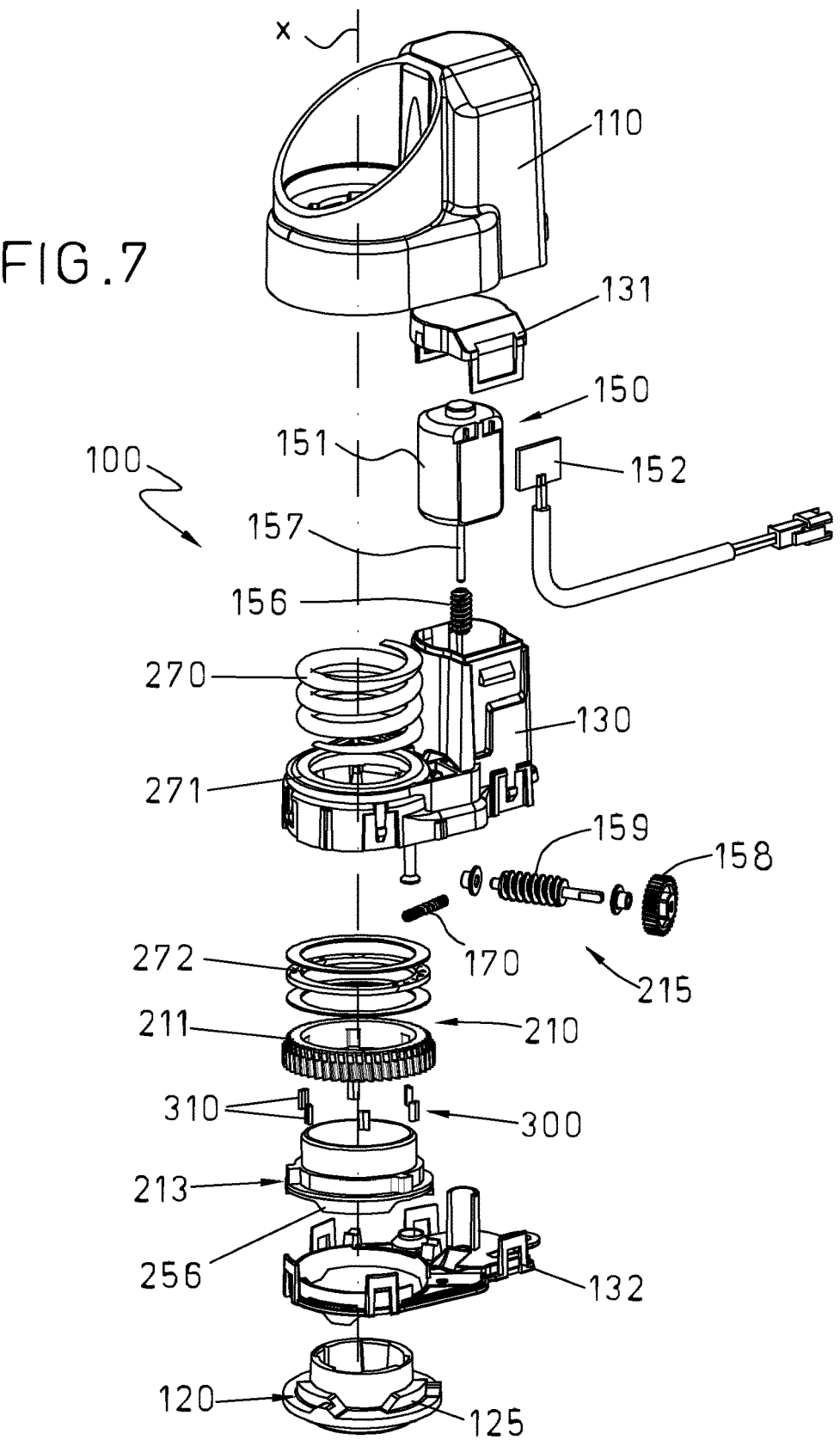
FIG. 7 is a general diagrammatic exploded view of a further example of a fold rear-view mirror assembly including a clutch mechanism.

In the example of FIG. 7, the one-way clutch mechanism 300 comprises a number of interlocking members 310 adapted to be received in corresponding recesses 214 formed on an inner surface of the gear wheel 211 of the ring gear assembly 210 as shown in FIGS. 8 and 9. The recesses 214 may be for example radially distributed at equal angular intervals on the inner surface of the gear wheel 211. Any number of recesses 214 may be used although at least three recesses 214 are preferred.

The combination of interlocking members 310 and corresponding recesses 214 allows the gear wheel 211 and the gear rim 213 to be rotated together in one direction and to be rotated relative to each other in a second, opposite direction. The second, opposite direction may be for example when the mirror housing 110 is actuated manually by the user for arranging it in the mirror operative condition in case of failure of the motor component 150.

The above mentioned recesses 214 may be configured so as to have an inclined surface or ramp 216. Such surface or ramp 216 is arranged at an angle relative to a tangential line T perpendicular to a reference line R passing through the center C of the ring gear assembly 210 and the point of contact of an interlocking member 310 with the gear rim 213 as shown in FIG. 10. The slope of the inclined surface or ramp 216 in each recess 214 increases in the direction of rotation of the ring gear assembly 210 into the mirror operative condition. The inclined plane or ramp 216 may be configured as a flat or curved surface.

In the particular example shown in FIG. 13, the recesses 214 are not formed on an inner surface of the gear wheel 211 but on an inner surface of a separate piece 260. In the example shown, said separate piece is a ring 260 adapted to be fitted inside the gear wheel 211 such that it at least partially surrounds an extending portion 213a that is formed projecting from the gear rim 213.

The interlocking members 310 of the clutch mechanism 300 can be shifted between an interlocking and a non-interlocking position. In the interlocking position, the ring gear assembly 210 is rotated as a whole in a first direction of rotation when the mirror housing 110 is actuated by the motor component 150.

In the non-interlocking position, the gear wheel 211 and the gear rim 213 can be rotated relative to each other when the mirror housing 110 is actuated manually by the user in a reverse, second direction of rotation for arranging it in a mirror operative condition in case of failure of the motor component 150.

In the example of the one-way clutch mechanism 300 shown in FIG. 10, the interlocking members comprise rollers 219. The rollers 219 are adapted to be received within a corresponding recess 214 of the gear wheel 211. The rollers 219 are in contact both with the gear rim 213 and the inclined surface or ramp 216 of the recess 214. Shifting from the above mentioned interlocking and non-interlocking positions of the rollers 219 is carried out as they are driven when contacted by a peripheral outer surface of the gear rim 213. Here, the rollers 219 are part of a roller clutch for connecting and disconnecting the gear wheel 211 and the gear rim 213 of the ring gear assembly 210 depending on the direction of rotation.

As the ring gear assembly 210, and therefore the motor housing 130, is rotated by a manual force exerted by the user on the mirror housing 110, frictional contact of the roller 219 when contacted by the peripheral outer surface of the gear rim 213 causes the roller 219 to roll on the gear rim 213 as well as on the inclined surface 216 of the recess 214 against biasing means 218. Thus, as the rollers 219 roll on the inclined surface 216 of the recess of the gear wheel 211 against the biasing means 218, the gear wheel 211 rotates relative to the gear rim 213. This allows the mirror housing 110 to be arranged from the mirror folded condition to the mirror operative condition for driving in case of failure of the motor component 150, for example.

Thus, rollers 219 and ramps 216 define the above mentioned roller clutch that allows the user to arrange the mirror housing 110 manually in an accurate, specific arrangement since a large number of intermediate angular positions of the mirror housing 110 is possible due to the provision of projections 125 in the base member 120 and the projections 256 in the gear rim 213.

In the example of the one-way clutch mechanism 300 shown in FIG. 11, the interlocking members 310 comprise teeth 220 formed in the gear wheel 211. The gear wheel teeth 220 are adapted for meshing with corresponding teeth 217 formed in the gear rim 213. The gear wheel teeth 220 and the gear rim teeth 217 both define a tooth clutch 300. As above, the tooth clutch 300 allows the gear wheel 211 and the gear rim 213 to be rotated together in a first direction when the gear wheel 211 is actuated by the motor component 150 between a mirror folded position and a mirror operative position and vice versa. In turn, the tooth clutch 300 allows relative rotation of the gear wheel 211 to the gear rim 213 for arranging the mirror housing 110 from the mirror folded position to the mirror operative position by acting manually on the mirror housing 110 by the user in case of failure of the motor component 150.

Thus, in case of failure of the motor component 150, the mirror housing 110 can be rotated manually by the user to the mirror operative condition for driving, but also to any other intermediate mirror position as required. A large number of intermediate mirror positions are again available into which the mirror housing 110 can be arranged if the motor component 150 does not work. Again, this is possible since the size of the teeth 217, 220 involved in the tooth clutch 300 are small and a large number of gear wheel teeth 220 and gear rim teeth 217 can be provided as compared to base member projections 125 and gear rim projections 256.

With the present mirror assembly 100 shown in FIGS. 7-12 of the drawings with the above described roller or tooth clutch mechanism 300, rotation of the mirror housing 110 by the user is allowed without requiring strong force to be exerted in order to compress the main spring 270. The mirror housing 110 can be locked effectively in the driving position but also in other intermediate positions if required and left locked therein.

It is to be noted that, the ring gear assembly 210 is designed such that the mirror housing 110 cannot be folded manually by the user, that is, it cannot be driven manually by the user from the mirror operative condition (driving position) into the mirror folded condition (parking position) because a stronger force is required for compressing the main spring 270 in this direction of rotation of the mirror housing 110 than in the reverse direction of rotation of the mirror housing 110.

As described above and as shown in FIG. 1, a main spring 270 is provided to force the motor housing 130 against the base member 120. The main spring 270 could be however arranged in different locations as long as the ring gear assembly 210 is urged against the base member 120. For example, a portion of the mirror housing 110 may be located between the motor housing 130 and the main spring 270 such that the main spring 270 urges the mirror housing 110 and, in turn, the motor housing 130, against the base member 120.

Sliding tracks 271 are also provided associated with the main spring 270 for facilitating relative rotation of the motor housing 130 and the mirror housing 110 relative to the base member 120.

The main spring 270 is designed such that that the mirror housing 110 cannot be folded manually by the user from the mirror operative condition into the mirror folded condition since a stronger force is required for compressing the main spring 270 in this direction of rotation of the mirror housing 110 than in the reverse direction of rotation.

A spring element 170, such as a metal compression spring, is also provided. As shown in FIG. 2, the spring element 170 is arranged with a first end 172 thereof attached to the motor housing 130 and with an opposite second end 173 thereof received into a slide surface 212 that is formed in the gear rim 213 such that the spring element 170 is positioned in a direction that is substantially tangential to the gear wheel assembly 210 as shown in FIG. 2 of the drawings.

The spring element 170 is adapted to cooperate with the gear wheel assembly 210 such that in a first direction of rotation, the mirror housing 110 is allowed to rotate relative to the base member 120. Thus, when the mirror housing 110 is actuated by the user for arranging it in a given mirror housing position, the spring element 170 allows rotation of the mirror housing 110 relative to the base member 120 and, in turn, the spring element 170 resiliently deforms as it slides against a slide surface 212 formed in the gear rim 213.

The spring element 170 is also adapted to cooperate with the ring gear assembly 210 such that in a second, reverse direction of rotation the mirror housing 110 is prevented from being rotated relative to the base member 120, where the second end 173 of the spring 170 resiliently abuts a stop surface 175 formed in the slide surface 212 of the gear rim 213. In this case, the spring element 170 acts as an end of run stop for the mirror housing 110 in a given mirror housing position.

As the mirror housing 110 is rotated from the mirror folded condition (parking position) to the mirror operative condition (drive position) the spring element 170 defines the final mirror operative condition (drive position). Thus, when the mirror housing 110 is rotated manually the gear wheel 211 rotates relative to the gear rim 250 and as user continues to rotate the mirror housing 110 it abuts the spring element 170 until it is released when a final, mirror operative condition has been reached. The biasing action of the spring element 170 removes tolerances between the ring gear assembly 210 and the gear rim 213 as the mirror housing 110 is rotated manually by the user. Therefore, the spring element 170 also prevents the mirror operative condition (drive position) from being exceeded.

With the present mirror assembly 100 rotation of the mirror housing 110 by the user is allowed without requiring strong force to be exerted until a desired angular position of the mirror housing 110 has been reached where the mirror housing 110 is locked effectively by means of the spring element 170.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

Thus, for example, a number of spring elements 170 could be provided as long as they are positioned in a direction that is substantially tangential to the ring gear assembly 210 for cooperating with the ring gear assembly 210.

In addition, although the mirror housing 110 and the base member 120 have been described as capable of being rotated around a mirror rotation axis x between a mirror operative condition and a mirror folded condition, and vice versa, other limits for the angular positions of the mirror housing 110 and the base member 120 are envisaged, such as for example a position where the mirror housing 110 has been rotated beyond the mirror operative condition in order to prevent people from harming themselves by hitting the mirror assembly 100 when the mirror housing 100 is in the operative condition.

Reference signs related to drawings and placed in parentheses in a claim, are solely for attempting to increase the intelligibility of the claim, and shall not be construed as limiting the scope of the claim.

The invention claimed is:
1. Foldable rear-view mirror assembly, the mirror assembly comprising:

a base member for being mounted on a motor vehicle;
a mirror housing;
a motor component;
drive means comprising a ring gear assembly and engaging the motor component with the base member for rotation of the mirror housing relative to the base member around a mirror rotation axis between a mirror operative condition and a mirror folded condition, and vice versa; and
a spring element positioned in a direction that is substantially tangential to the ring gear assembly in a direction of rotation and adapted to cooperate with the ring gear assembly, such that:
the mirror housing is allowed to rotate relative to the base member in a first direction of rotation; and
the mirror housing is prevented from being rotated relative to the base member in a second, reverse direction of rotation, where the spring element resiliently abuts a stop surface.

2. The assembly according to claim 1, where the spring element is adapted to resiliently deform as it slides against the ring gear assembly when the mirror housing is rotated relative to the base member in said first direction of rotation.

3. The assembly according to claim 2, where resilient deformation of the spring element is flexure.

4. The assembly according to claim 1, where the ring gear assembly is disposed coaxially with the mirror rotation axis.

5. The assembly according to claim 1, further comprising a slide surface for at least partially receiving the spring element therein.

6. The assembly according to claim 5, where the slide surface is formed in the ring gear assembly.

7. The assembly according to claim 5, where the slide surface is formed in the mirror housing.

8. The assembly according to claim 5, where the stop surface is formed in the slide surface and arranged radially to the mirror rotation axis.

9. The assembly according to claim 8, where the stop surface is substantially perpendicular to the slide surface.

10. The assembly according to claim 1, further comprising a motor housing for receiving the motor component therein, the motor housing being attached to the mirror housing.

11. The assembly according to claim 1, where the spring element is a compression spring.

12. The assembly according to claim 1, where the spring element has a first end attached to the mirror housing and a second end received into the ring gear assembly.

13. The assembly according to claim 1, where the spring element has a first end attached to the ring gear assembly and a second end received into the mirror housing.

14. The assembly according to claim 1, further comprising a one-way clutch mechanism for allowing the gear wheel and the gear rim to be rotated together in one direction, and to be rotated relative to each other in a second, opposite direction.

15. The assembly according to claim 1, further comprising at least one of: (i) an illumination module; (ii) an imaging device configured for imaging an image of the surroundings of the vehicle; (iii) a mirror pane housed in the mirror housing and positioned so as to provide a substantially rear field of view to a vehicle driver when the mirror housing is positioned in the driving position; (iv) an anti-glare mirror pane housed in the mirror housing and positioned so as to provide a substantially rear field of view to a vehicle driver when the mirror housing is positioned in the driving position; (v) a mirror pane housed in the mirror housing and positioned so as to provide a substantially rear field of view to a vehicle driver when the mirror housing is positioned in the driving position comprising a heating element; (vi) a spotter mirror housed in the mirror housing and positioned so as to substantially provide vision of a vehicle blind spot region to the vehicle driver when the mirror housing is positioned in the driving position; (vii) an antenna for communicating with a radio-frequency reception system; (viii) an actuation mechanism configured to provide orientation of the mirror pane to adjust the rear field of view of the vehicle driver; and (ix) an outdoor temperature sensing device configured to sense an outdoor temperature of the vehicle.

16. The assembly according to claim 14, where the one-way clutch mechanism comprises a roller clutch.

17. The assembly according to claim 14, where the one-way clutch mechanism comprises a tooth clutch.

18. The assembly according to claim 1, where the assembly is a motor vehicle mirror assembly.

* * * * *